United States Patent
Zaccaria et al.

(10) Patent No.: US 7,856,295 B2
(45) Date of Patent: Dec. 21, 2010

(54) DEVICE FOR ISSUING AUTHORIZATION TO ACT ON THE OPERATING CONDITIONS OF AN AIRCRAFT ENGINE AND ENGINE CONTROL SYSTEM COMPRISING SAME

(75) Inventors: Patrick Zaccaria, Toulouse (FR); Marie-Pierre Fuertes, Toulouse (FR)

(73) Assignee: Airbus France, Toulouse (FR)

( * ) Notice: Subject to any disclaimer, the term of this patent is extended or adjusted under 35 U.S.C. 154(b) by 817 days.

(21) Appl. No.: 11/721,035

(22) PCT Filed: Dec. 12, 2005

(86) PCT No.: PCT/FR2005/003100
§ 371 (c)(1),
(2), (4) Date: Jun. 6, 2007

(87) PCT Pub. No.: WO2006/067295
PCT Pub. Date: Jun. 29, 2006

(65) Prior Publication Data
US 2009/0240386 A1    Sep. 24, 2009

(30) Foreign Application Priority Data
Dec. 20, 2004    (FR) .................................. 04 13553

(51) Int. Cl.
*G01C 5/00*    (2006.01)
(52) U.S. Cl. ................... 701/9; 701/10; 701/11; 701/12; 340/945; 244/59; 244/81; 244/97
(58) Field of Classification Search ............ 701/4, 701/9–12; 340/945; 244/59, 53 R, 81, 97; 429/13, 413
See application file for complete search history.

(56) References Cited

U.S. PATENT DOCUMENTS 2,938,683 A * 5/1960 Morrison ................... 244/81
3,801,372 A * 4/1974 Shaw ......................... 429/431
5,106,035 A * 4/1992 Langford, III ............. 244/59

(Continued)

FOREIGN PATENT DOCUMENTS

DE    4-119334    * 12/1992

(Continued)

OTHER PUBLICATIONS

Hybrid fuel cell power in aircraft; Rajashekara, K.; Grieve, J.; Daggett, D.; Industry Applications Magazine, IEEE vol. 14, Issue: 4; Digital Object Identifier: 10.1109/MIAS.2008.923606; Publication Year: 2008, pp. 54-60 20030075643 "20030230671" | "20040088085" |.*

(Continued)

*Primary Examiner*—Cuong H Nguyen
(74) *Attorney, Agent, or Firm*—Dickinson Wright PLLC

(57) ABSTRACT

A device for issuing authorization to act on the operating conditions of an aircraft engine and engine control system includes a first unit for determining particular parameters concerning the aircraft, including the position of a power lever controlling the supply of fuel to the engine, and a second unit for determining, based on the particular parameters, whether the aircraft is in a state authorizing an action on the operating conditions of the engine and for issuing, as the case may be, a corresponding authorization signal.

11 Claims, 2 Drawing Sheets

U.S. PATENT DOCUMENTS

| | | | |
|---|---|---|---|
| 5,285,634 A * | 2/1994 | Hoff et al. | 60/792 |
| 5,810,284 A * | 9/1998 | Hibbs et al. | 244/13 |
| 6,119,979 A * | 9/2000 | Lee et al. | 244/97 |
| 6,322,915 B1 * | 11/2001 | Collins et al. | 429/413 |
| 6,568,633 B2 * | 5/2003 | Dunn | 244/59 |
| 2001/0018138 A1 * | 8/2001 | Iwase | 429/13 |
| 2002/0005454 A1 * | 1/2002 | MacCready et al. | 244/5 |
| 2003/0075643 A1 * | 4/2003 | Dunn | 244/59 |
| 2003/0230671 A1 * | 12/2003 | Dunn | 244/53 R |
| 2004/0088085 A1 * | 5/2004 | Nobre | 701/3 |

FOREIGN PATENT DOCUMENTS

| | | | |
|---|---|---|---|
| DE | 4119334 | | 12/1992 |
| GB | 528963 | * | 11/1940 |
| WO | 2004-039672 | * | 5/2004 |
| WO | 2004039672 | | 5/2004 |

OTHER PUBLICATIONS

The Design and Simulation of Fuzzy Logic Controller for Parallel Hybrid Electric Vehicles; Qun Zeng; Juhua Huang; Automation and Logistics, 2007 IEEE International Conference on; Digital Object Identifier: 10.1109/ICAL.2007.4338695; Publication Year: 2007, pp. 908-912.*

Fault tolerant control system for linear combustion engine; Deutsch, P.; Industrial Electronics, 2008. IECON 2008. 34th Annual Conference of IEEE; Digital Object Identifier: 10.1109/IECON.2008. 4757952; Publication Year: 2008, pp. 198-203.*

The airworthiness and reliability of aircraft electrical systems; Lewis, J.F.; Lloyd, E.; Proceedings of the IEE—Part A: Power Engineering; vol. 103, Issue: 1, Part: S; Digital Object Identifier: 10.1049/pi-a. 1956.0007; Publication Year: 1956, pp. 34-49.*

Recent developments in aircraft emergency power; Koerner, M.; Energy Conversion Engineering Conference and Exhibit, 2000. (IECEC) 35th Intersociety; vol. 1; Digital Object Identifier: 10.1109/IECEC.2000.870618; Publication Year: 2000, pp. 12-19 vol. 1.*

PCT International Search Report dated May 2, 2006.

* cited by examiner

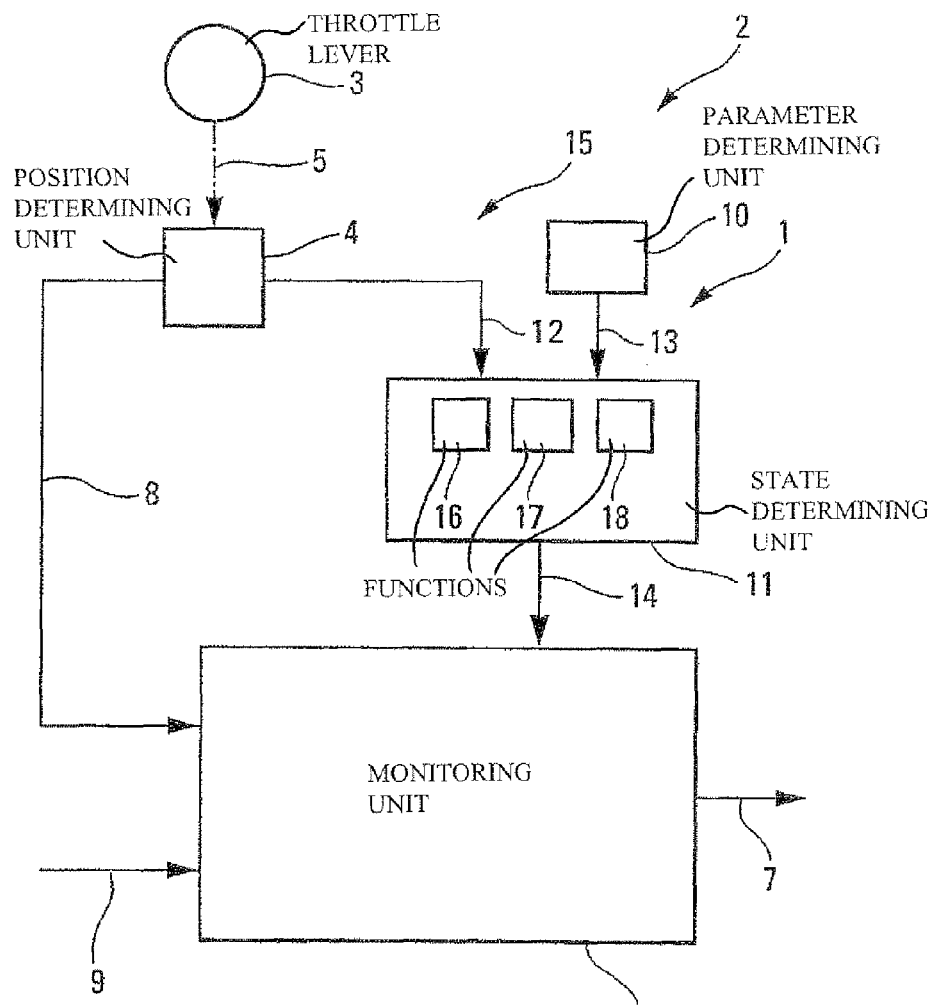
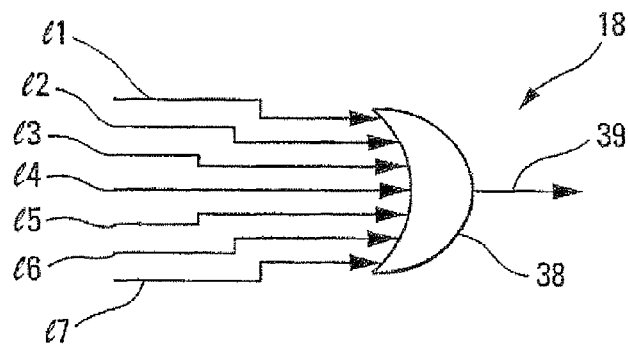

DEVICE FOR ISSUING AUTHORIZATION TO ACT ON THE OPERATING CONDITIONS OF AN AIRCRAFT ENGINE AND ENGINE CONTROL SYSTEM COMPRISING SAME

FIELD OF THE INVENTION

The present invention relates to a device for issuing authorization to act on the operating conditions of an aircraft engine and a control system for at least one engine comprising same.

BACKGROUND OF THE RELATED ART

It is known that there exist faults of the propulsion system of an aircraft, in particular faults for which the thrust of at least one engine no longer complies with the command of the pilot, which may have a direct and significant impact on the safety of the aircraft. To alleviate such faults, provision may be made on the aircraft for devices intended to automatically cut off the faulty engine. However, such a cut-off is not possible in all the phases of flight and for all the states of the aircraft.

SUMMARY OF THE INVENTION

The object of the present invention is to remedy these drawbacks. It relates to a device for issuing an authorization signal authorizing appropriate means to act on the operating conditions of at least one engine of an aircraft.

For this purpose, according to the invention, said device is noteworthy in that it comprises:
  first means for determining particular parameters relating to the aircraft, including the position of a throttle lever controlling the fuel supply to the engine; and
  second means for determining, on the basis of said particular parameters, whether the aircraft is in a state authorizing an action on the operating conditions of the engine, and for issuing, as appropriate, a corresponding authorization signal.

Thus, by virtue of the invention, appropriate means specified hereinbelow, which are able to act on the operating conditions of an engine (by cutting off this engine or by reducing its flow rate for example), are authorized to act on said engine only if the device in accordance with the invention has previously issued a corresponding authorization signal, depending at least on the position of the throttle lever controlling this engine.

Consequently, by virtue of the parameters taken into account in accordance with the invention and specified hereinbelow, provision may be made for the authorization (in particular to cut off the engine) to be given by said device only if appropriate conditions, in particular all the required safety conditions, are in effect. For this purpose, it suffices to take account of the parameters allowing these conditions to be properly represented.

In a preferred embodiment, said second means issue an authorization signal, when the aircraft is on the ground and the engine is idling.

In this case, advantageously, said second means determine that the engine is idling, when at least the position of the throttle lever for said engine is below or equal to an idling position. To consolidate this check, advantageously, said second means determine that said engine is idling, when moreover the position of a throttle lever for another engine of the aircraft is below or equal to a predetermined position.

Furthermore, advantageously, said second means determine that the aircraft is on the ground, when at least ground spoilers are extended or a main landing gear of the aircraft is compressed. To consolidate this check, advantageously, said second means determine that the aircraft is on the ground, when moreover the height of the aircraft with respect to the ground is below a predetermined height or the speed of the wheels of the aircraft is above a predetermined speed.

Furthermore, advantageously, said second means also issue an authorization signal, when at one and the same time:
  the height of the aircraft with respect to the ground is below a predetermined height;
  the output of the engine is above a predetermined output; and
  the position of the throttle lever is below or equal to a predetermined position.

Additionally, in a particular embodiment, the device in accordance with the invention furthermore comprises:
  third means for determining whether the following conditions are realized:
    a) another engine of the aircraft is faulty;
    b) another engine is off; and
    c) an authorization signal is issued for another engine; and
  fourth means for disabling the issuing of an authorization signal, when said third means detect the realization of one at least of said conditions a), b) and c).

The present invention also relates to a system for controlling at least one engine of an aircraft, of the type comprising at least:
  a throttle lever able to be actuated by a pilot of the aircraft, to control the fuel supply to the engine; and
  a means of monitoring and of regulating the engine, which is able to act on the operating conditions of said engine.

According to the invention, said control system furthermore comprises at least one device such as that described above for issuing an authorization signal, and said monitoring and regulating means is formed in such a way as to be able to act on the operating conditions of said engine only if it has previously received an authorization signal issued by said device.

Preferably, said monitoring and regulating means is able to act on the operating conditions of the engine, by modifying the flow rate of fuel of said engine or by cutting off said engine.

In a particular embodiment intended for the control of a plurality of engines of an aircraft, advantageously, said control system comprises a plurality of assemblies associated respectively with said engines and each comprising a throttle lever, a monitoring and regulating means, a device for issuing an authorization signal.

BRIEF DESCRIPTION OF THE DRAWING

The figures of the appended drawing will elucidate the manner in which the invention may be embodied. In these figures, identical references designate similar elements.

FIG. 1 is the schematic diagram of an engine control system in accordance with the invention.

FIGS. 2 to 4 diagrammatically illustrate various operations implemented for a device in accordance with the invention.

DETAILED DESCRIPTION OF THE INVENTION

Figure 2:
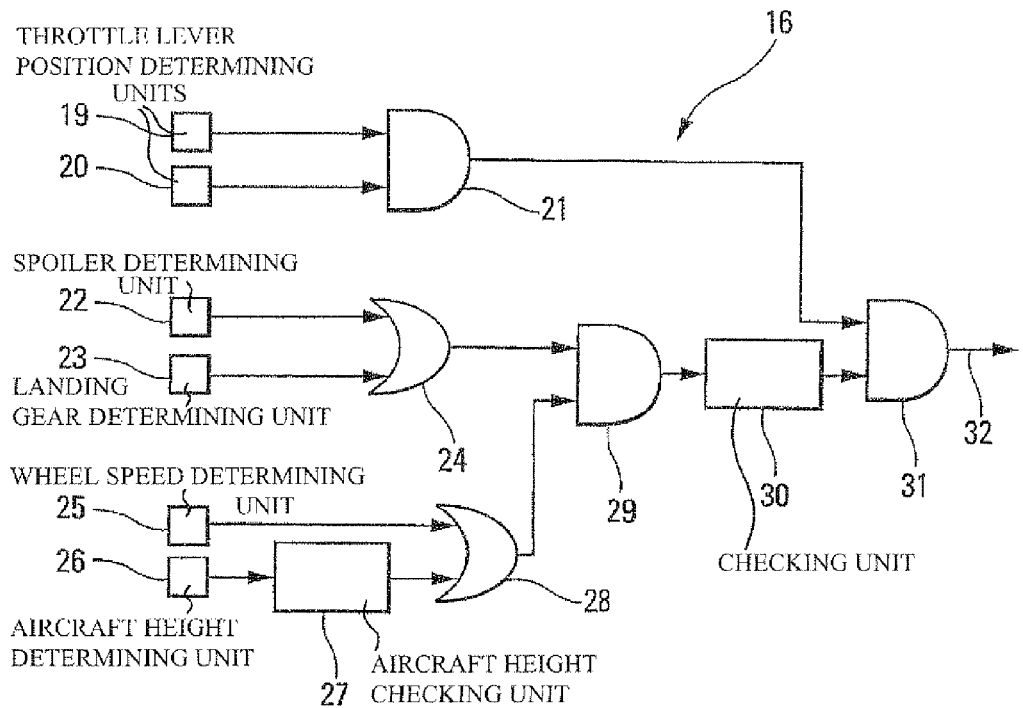

The device 1 in accordance with the invention is mounted, as illustrated in FIG. 1, in a control system 2 for at least one engine (not represented) of an aircraft and is intended to issue an authorization signal specified hereinbelow.

Said control system 2 comprises, in standard fashion, at least one assembly 15 comprising:

- a throttle lever 3 able to be actuated by a pilot of the aircraft, to control the fuel supply to the associated engine;
- a means 4 for determining the position of the throttle lever 3, as illustrated by a chain-dotted link 5, and for formulating a signal representative of this position; and
- a means 6 of monitoring and of regulating the engine, which is able to act on the operating conditions of said engine, by way of a link 7, as a function of the aforesaid signal received from said means 4 by way of a link 8 and of other parameters (such as the value of the output N1 of the low-pressure compressor of the engine in particular) received by way of a link 9.

Said means 6 of monitoring and of regulating the engine is formed so as to act on the engine, either by cutting it off, or by reducing the flow rate of fuel, and hence the power provided by said engine, when the latter exhibits a problem that may have a direct impact on safety, in particular during a TCM ("Trust Control Malfunction") fault for which the thrust of the engine no longer complies with the command of the pilot.

Of course, such an action on the engine is not possible in all the phases of flight and for all the states of the aircraft.

Also, according to the invention, said monitoring and regulating means 6 is formed in such a way as to be able to act on the operating conditions of said engine only if it has previously received an authorization signal issued by said device 1.

For this purpose, said device 1 comprises according to the invention:

- means 4, 10, for determining particular parameters relating to the aircraft, including the position of the throttle lever 3 controlling the fuel supply to the controlled engine. To do this, said means 4 can comprise a resolver and a potentiometer for example; and
- means 11 for determining, on the basis of said particular parameters received by way of links 12 and 13 of said means 4 and 10, whether the aircraft is in a state authorizing an action on the operating conditions of the engine, and for issuing, as appropriate, a corresponding authorization signal, which is transmitted by way of a link 14 to said means 6.

Consequently, by virtue of the parameters taken into account by said means 11 in accordance with the invention, which will be specified hereinbelow, provision may be made for the authorization (in particular to cut off the engine) to be given by the device 1 only if appropriate conditions, in particular required safety conditions, are in effect, in particular as a function of the current flight phase and of the current state (speed, configuration, etc.) of the aircraft. To do this, it suffices for the device 1 to take account of the parameters illustrating these conditions as well as possible.

In a particular embodiment:

- said means 6 of monitoring and of regulating the engine is a standard full-authority digital engine control system of the FADEC type. It is known that a FADEC type system possesses two channels. An active channel which manages the thrust and a so-called passive channel which makes it possible to monitor said active channel and to initiate a cut off if necessary, that is to say if the engine does not comply with the command of the pilot and the resultant thrust gives rise to an uncontrolled situation of the aircraft; and/or
- said means 11 is a primary computer, of PRIM type, which has the advantage of being critical (level A) and of knowing the position of the throttle lever 3 of the engine, as well as the phase of flight (with characteristics such as the altitude, the speed of the aircraft or that of the wheels).

In a particular embodiment, said means 11 activate, by way of the link 14, a relay for closing a circuit to the channels of the FADEC system which the latter interprets as an authorization to act (in particular a cut-off authorization) if a fault of aforesaid TCM type is detected.

Additionally, in a particular embodiment intended for the control of a plurality of engines of an aircraft, in particular of a transport airplane, said control system 2 comprises a plurality of assemblies 15 each of which is associated with one of said engines and comprises on each occasion, as indicated previously, in particular a throttle lever 3, a monitoring and regulating means 6, and a device 1 for issuing an authorization signal.

Said means 11 comprise various functions which may be implemented in particular as a function of the phase of flight of the aircraft. Some 16, 17, 18 of these functions will be specified hereinafter.

The function 16 represented diagrammatically in FIG. 2 is applied to the case where the aircraft is on the ground.

This function 16 comprises:

- a means 19 for determining whether the position of the throttle lever 3 of said engine is below or equal to an idling position, that is to say whether this position commands a fuel flow rate which is below or equal to that commanded for said idling position;
- a means 20 for determining whether the position of another throttle lever of the aircraft, that is to say a throttle lever commanding another engine of the aircraft other than that considered currently, is below or equal to a predetermined position;
- an AND logic gate 21 which is connected to said means 19 and 20;
- a means 22 for determining whether ground spoilers of the aircraft are extended;
- a means 23 for determining whether a main landing gear of the aircraft is compressed, that is to say whether the latter is touching the ground;
- an OR logic gate 24 which is connected to said means 22 and 23;
- a means 25 for determining whether the speed of the wheels of the aircraft is above a predetermined speed;
- a means 26 for determining whether the height of the aircraft with respect to the ground (received by a radio-altimeter) is above a predetermined height;
- a means 27 for checking and indicating, as appropriate, that the height of the aircraft with respect to the ground has been above said predetermined height, for at least a predetermined duration;
- an OR logic gate 28 connected to said means 25 and 27;
- an AND logic gate 29 connected to said OR logic gates 24 and 28;
- a means 30 for checking and indicating, as appropriate, that the result received from said AND logic gate 29 has been true for at least a predetermined duration; and
- an AND logic gate 31 which is connected to the AND logic gate 21 and to the means 30 and which is able to issue, as appropriate, an authorization signal by way of a link 32 connected to the link 14.

Consequently, said function 16 of said means 11 issues an authorization signal, when:

the engine is idling, that is to say when:
- the position of the throttle lever 3 of said is engine is below or equal to an idling position (means 19); and
- (gate 21)

the position of a throttle lever of another engine of the aircraft is below or equal to a predetermined position (means 20); and (gate 31)

the aircraft is on the ground, that is to say when:
   ground spoilers are extended (means 22) or (gate 24) a main landing gear of the aircraft is compressed (means 23); and (gate 29)
   the speed of the wheels of the aircraft is above a predetermined speed (means 25) or (gate 28), the height of the aircraft with respect to the ground is below a predetermined height (means 26).

Figure 3:
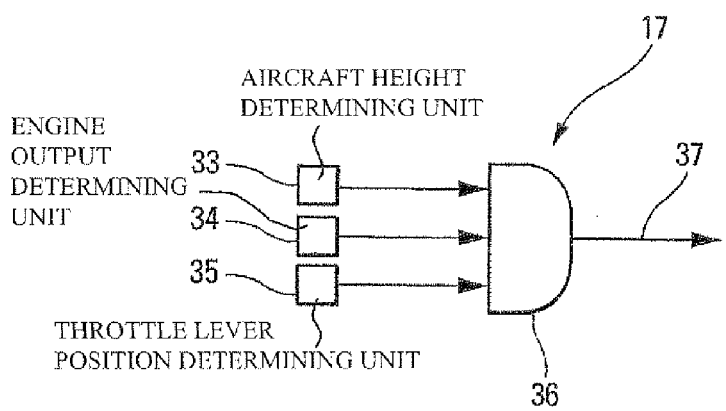

Additionally, the function 17 which is represented diagrammatically in FIG. 3, is applied to the case where the aircraft is in a phase of flight in proximity to the ground (so-called "flare"), relating to a phase of transition between the approach altitude and the landing altitude.

This function 17 comprises:
a means 33 for determining whether the height of the aircraft with respect to the ground (received by a radio-altimeter) is below a predetermined height;
a means 34 for determining whether the output of the engine is above a predetermined output;
a means 35 for determining whether the position of the throttle lever 3 is below or equal to a predetermined position; and
an AND logic gate 36 which is connected to said means 33, 34 and 35 and which is able to issue an authorization signal by way of a link 37 connected to the link 14.

Consequently, said function 17 issues an authorization signal, when at one and the same time (gate 36):
the height of the aircraft with respect to the ground is below a predetermined height (means 33);
the output of the engine is above a predetermined output (means 34); and
the position of the throttle lever 3 is below or equal to a predetermined position (means 35).

Additionally, the function 18 represented in FIG. 4 makes it possible to disable the issuing of an authorization signal and hence to prevent the device 1 from issuing such a signal or indeed from cancelling such a signal previously issued by said device 1.

More precisely, said function 18 disables the issuing of an authorization signal by way of a link 39, when one of the following conditions a), b) and c) is realized:
a) at least one other engine of the aircraft is faulty (the various information regarding the other engines is respectively received by way of links 11, 12 and 13); or (OR logic gate 38)
b) at least one other engine of the aircraft has been cut off (information received by links 14, 15 and 16); or (gate 38);
c) an authorization signal is or has been issued by a device 1 for another engine (information received by a link 17).

The invention claimed is:

1. A device for issuing an authorization signal corresponding to an authorization to act on the operating conditions of at least one engine of an aircraft, said device comprising:
   first means for determining particular parameters relating to the aircraft, including the position of a throttle lever controlling the fuel supply to the engine; and
   second means for determining, on the basis of said particular parameters, whether the aircraft is in a state authorizing an action on the operating conditions of the engine, and for issuing, as appropriate, a corresponding authorization signal,
   wherein said device furthermore comprises:
   third means for determining whether the following conditions are realized:
   a) another engine of the aircraft is faulty;
   b) another engine is cut off; and
   c) an authorization signal is issued for another engine; and
   fourth means for disabling the issuing of an authorization signal, when said third means detect the realization of one at least of said conditions a), b) and c).

2. The device as claimed in claim 1, wherein said second means issue an authorization signal, when at one and the same time:
   the height of the aircraft with respect to the ground is below a predetermined height;
   the output of the engine is above a predetermined output; and
   the position of the throttle lever is below or equal to a predetermined position.

3. The device as claimed in claim 1, wherein said second means issue an authorization signal, when the aircraft is on the ground and the engine is idling.

4. The device as claimed in claim 3, wherein said second means determine that the engine is idling, when at least the position of the throttle lever for said engine is below or equal to an idling position.

5. The device as claimed in claim 4, wherein said second means determine that the engine is idling, when moreover the position of a throttle lever for another engine of the aircraft is below or equal to a predetermined position.

6. The device as claimed in claim 3, wherein said second means determine that the aircraft is on the ground, when at least ground spoilers are extended or a main landing gear of the aircraft is compressed.

7. The device as claimed in claim 6, wherein said second means determine that the aircraft is on the ground, when moreover the height of the aircraft with respect to the ground is below a predetermined height or the speed of the wheels of the aircraft is above a predetermined speed.

8. A system for controlling at least one engine of an aircraft, said control system comprising at least:
   a throttle lever able to be actuated by a pilot of the aircraft, to control the fuel supply to the engine; and
   a means of monitoring and of regulating the engine, which is able to act on the operating conditions of said engine,
   wherein said system furthermore comprises at least one device such as that specified in claim 1, for issuing an authorization signal, and in that said monitoring and regulating means is formed in such a way as to be able to act on the operating conditions of said engine only if it has previously received of an authorization signal issued by said device.

9. An aircraft comprising at least one control system such as that specified in claim 8, for controlling at least one engine of said aircraft.

10. The control system as claimed in claim 8, wherein said monitoring and regulating means is able to act on the operating conditions of the engine, by modifying the flow rate of fuel of said engine or by cutting off said engine.

11. The control system as claimed claim 8, for controlling a plurality of engines of the aircraft, wherein said system comprises a plurality of assemblies associated respectively with said engines and each comprising a throttle lever, a monitoring and regulating means, and a device for issuing an authorization signal.

* * * * *